3,524,662
COUPLING FOR HARD CAST IRON PIPE
Edgar B. Tolman, Winnetka, Louis L. Hudson, Jr., Chicago, and Arthur Rasmussen, Elk Grove Village, Ill., assignors to United Conveyor Corporation, a corporation of Illinois
Filed Mar. 21, 1969, Ser. No. 809,097
Int. Cl. F16l 19/02
U.S. Cl. 285—368                                  6 Claims

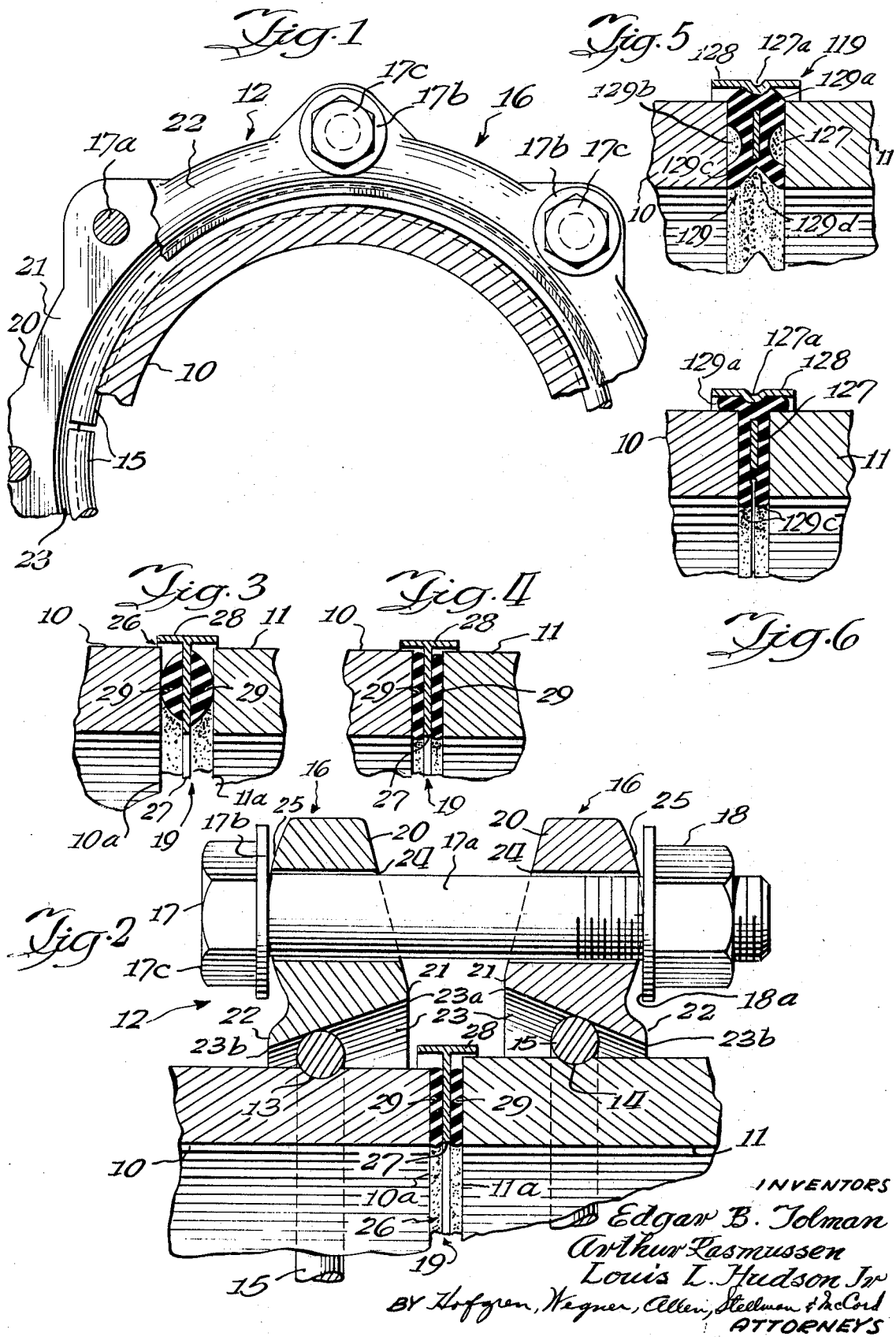

ABSTRACT OF THE DISCLOSURE

A coupling for joining two lengths of extremely hard pipe made of cast iron, tile, porcelain or glass; there being shallow, arcuate circumferential grooves close to adjacent ends of the pipe lengths. A pair of split rings which are round in cross section are seated in the grooves and a bolting collar embraces each ring, said collars having frusto-conical ring contacting inner surfaces which are larger in circumference than the rings at a face of the collar near the adjacent pipe ends and smaller than the rings but larger than the pipe at a face of the collar remote from said pipe ends. A compressible gasket is positioned between the adjacent ends of the pipe lengths, and bolts loosely impale aligned holes in the collars and cooperate with nuts to draw the collars toward one another so that clamping force exerted by the bolts and nuts is transmitted through the rings and the walls of the grooves to firmly couple the pipe lengths together with the gasket compressed between said pipe ends and the rings locked in the grooves.

BACKGROUND OF THE INVENTION

The centrifugal casting of iron pipe produces a very superior product for certain applications at a relatively low foundry labor cost. Such pipe is very commonly used in liquid and gas pipeline construction, and a rapidly expanding area of use for the pipe is in pipelines for the pneumatic or hydraulic transportation of abrasive solids such as coal, or ash from coal burning furnaces, or granular material from mining operations. An ash handling pipeline may carry material as hot as 700° F., and in certain climates pipelines for that and other uses may be in ambient temperatures as low as 50° below zero F.

Certain limitations in the structure of the pipe present problems in the coupling of successive lengths of pipe. In the first place, it is not practical to cast the pipe with a flange on each end; and in the second place, the pipe may not be economically cast in short lengths. Eighteen foot lengths are usual. Furthermore, the extreme hardness of the pipe makes it impractical to machine it except for very minimal operations such as citting it to required lengths by grinding, and grinding shallow circumferential grooves around it.

The couplings now in general use for such pipe are of three types—one, the bell and spigot joint; two, the mechanical joint; and three, the Dresser coupling. Such couplings are excellent for the application for which they were designed, but none of them is suitable for pipelines handling abrasive solids. There are several reasons as follows:

(1) The couplings do not adequately prevent separation of lengths of pipe when operating at an internal pressure of 100 p.s.i. or more.

(2) The couplings are designed to be flexible so that the lines may be run across irregular terrain. Abrasive material handling systems must be run as straight as possible to minimize the high wear caused by bends in the pipeline; and the three commercially available types of couplings do not maintain adequate alignment between adjacent lengths of pipe.

(3) Both the bell and spigot joint and the mechanical joint have the small outside diameter of one end of a length of pipe fitting into an enlarged section at the end of the next length of pipe. This produces an overlap of about 4", making it very difficult to replace a worn pipe unless it is near the free end of the pipeline.

(4) The Dresser coupling does not assure assembly of two lengths of pipe with their ends abutting; and even if they are originally abutting, expansion and contraction of the pipe lengths may separate them. This subjects the pipe to very severe wear from the abrasive material passing through it, and also increases the resistance to flow through the joints.

(5) Furthermore, these three types of couplings have a gasket that seals against the outside diameter of the pipe; and this makes all of them inapplicable to high pressure pipelines which convey material at high temperature because high temperatures cause rapid deterioration of flexible rubber gaskets, while wide temperature variations break the seal of pliable heat resisting gaskets, formed of material such as asbestos, because they do not spring back to their original shape once they are deformed. The diameter of the pipe in a hot conveying installation increases during conveying, thus expanding the gasket; and the subsequent contraction of the pipe upon cooling causes it to shrink away from the gasket and thus produce serious leaks which continue every time the conveyor is started until the pipe expands enough to make the seal tight.

It is essential, therefore, to place the sealing gasket between finished ends of the pipe for all high pressure and high temperature application.

Centrifugally cast pipe used for abrasive material pipelines should be cast with especially thick walls and of exceedingly hard, wear-resisting material. Thus, the problem of machining the pipe is particularly marked in the pipe which must be used for abrasive material transport. In addition to the special requirements which are inherent in the use of pipe which is slow and costly to grind, certain other requirements limit the type of joint or coupling which may successively be used in abrasive material pipelines as follows:

(1) Very thick pipe walls are required to provide satisfactory service life in view of the abrasive action of the transported materials, and this results in very heavy pipe; so the coupling must be very strong to align the pipe and eliminate the need of elaborate and expensive supports.

(2) Such pipelines may operate at pressures from near 0 absolute to as much as 400 p.s.i.; and the coupling must neither separate nor permit leakage under such extreme pressure conditions.

(3) Because of the wide range of ambient temperatures at which such pipelines must operate, and the high temperature of materials which may be conveyed in them, the pipe coupling must be capable of operating with no impairment of function from 50° below 0 F. to 700° F.

(4) The coupling must permit any length of pipe in a line to be removed with a minimum of separation of the pipe ends.

(5) Such pipelines usually wear fastest at the bottom, so the coupling must permit any one or several pipe lengths to be rotated to compensate from uneven wear without dismantling the couplings.

(6) In the centrifugal casting of iron pipe it is very difficult to maintain close tolerances; and as a result the outside diameter of successive lengths of such pipe may vary by nearly ¼". Thus a coupling for such pipe must be capable of connecting lengths of pipe having that much variation in outside diameter.

(7) Centrifugally cast iron pipe of the type used in abrasive material pipelines is extremely brittle, and likely to crack when subjected to sudden blows. Accordingly, while it is necessary for the coupling to be heavy and strong enough to hold adjacent lengths of pipe in alignment, it is highly desirable that the coupling have a degree of flexibility which causes it to cushion the pipe slightly against radial shocks.

(8) As a corollary to the above, the coupling must include a gasket which is sufficiently resilient that the slight inherent flexibility of the coupling permitting minor angular deviation between adjacent pipe ends cannot permit leakage at the pipe joint on the side where the angular deviation causes the pipe ends to be farther apart.

SUMMARY OF THE INVENTION

The present invention provides a coupling for hard, centrifugally cast iron pipe which minimizes costly grinding of the pipe, and which meets all the above enumerated criteria. Accordingly, the principal object of the present invention is to provide a pipe coupling for the above described pipe which is particularly suited for use in pipelines for the conveyance of highly abrasive material.

The stated principal object of the invention is achieved by constructing a coupling as set out in the Abstract of Disclosure of the present application, to which the following specific structural details are added:

(1) The bolting collars are made of strong, malleable material which is flexible enough to keep the joint from separating even if accidentally over-loaded, and to cushion the pipe slightly against radial shock. As used herein, the term "malleable material" includes steel, malleable or ductile iron, and high strength aluminum or plastic.

(2) The coupling gasket structure is one which will neither leak nor blow out over the wide range of internal pressures heretofore indicated, but it is sufficiently resilient to avoid leakage when there is angular deflection between adjacent pipe ends.

Two different gasket structures have been designed for use with the present coupling in pipelines where temperatures do not exceed about 400° F.; and both combine steel with natural or synthetic rubber. One such gasket simplifies the operation of removing a single length of pipe from a line.

For conveying high temperature material a commercially available steel and asbestos gasket is used. One suitable device is sold under the trademark Flexitallic spiral wound gasket, by Flexitallic Gasket Company of Camden, N.J.

DESCRIPTION OF THE DRAWINGS

FIG. 1 is a fragmentary transverse sectional view of a pipe, illustrating the coupling in elevation with parts broken away;

FIG. 2 is a fragmentary longitudinal sectional view on an enlarged scale showing the adjacent ends of two lengths of pipe joined by the coupling;

FIG. 3 is a fragmentary section on an enlarged scale illustrating a first form of rubber gasket as it appears before being compressed by drawing up of the couplings;

FIG. 4 is a view similar to FIG. 3 showing the first form of gasket after it is compressed by drawing up the coupling;

FIG. 5 is a fragmentary section on an enlarged scale illustrating a second form of rubber gasket as it appears before being compressed by drawing up of the couplings; and FIG. 6 is a view similar to FIG. 5 showing the second form of gasket after it is compressed by drawing up the coupling.

DETAILED DESCRIPTION OF THE INVENTION

Referring to the drawings in greater detail, and referring first to FIGS. 1 and 2, a first length 10 and a second length 11 of centrifugally cast iron pipe have adjacent ends 10a and 11a which are joined by the coupling structure of the present invention which is indicated generally by the reference numeral 12. As seen in FIG. 2 the pipe lengths 10 and 11 are of similar inside diameter, but the wall thickness of the pipe length 11 is substantially greater than that of the pipe length 10 so that their outside diameters are different. Shallow, arcuate circumferential grooves 13 and 14 are machined close to the adjacent ends 10a and 11a of the pipe lengths. Grooves having a depth of approximately 3/32" are adequate for the present couplings, and do not materially affect the strength of the pipe. Deeper grooves are undesirable for reasons of strength and pipe life in an abrasive material handling pipeline.

Seated in the grooves 13 and 14 are identical split rings 15 which are generally round in cross section and are made of steel so as to be substantially incompressible. As shown by FIG. 3 which is on a scale of 1 to 1, the cross-sectional diameter of the rings is 3/8", or 4 times the depth of the grooves. The rings 15 are embraced by bolting collars, indicated generally at 16, and the bolting collars are drawn toward one another by clamping means in the form of bolts 17 and nuts 18 so as to compress gasket means, indicated generally at 19, between the adjacent ends 10a and 11a of the pipe lengths.

Each of the bolting collars 16 is fabricated of malleable material, preferably iron or steel, and includes a body 20 having a first generally radially extending face 21 near the adjacent pipe end and a second generally radially extending face 22 remote from the adjacent pipe end. A ring engaging inner surface 23 of the bolting collar 16 has a circumference 23a at the first face 21 which is greater than the outside circumference of the ring 15 seated in the groove, and said surface has a circumference 23b at said second face 22 of the bolting collar 16 which is less than the outside circumference of the ring 15 but more than that of the larger O.D. pipe length 11. As illustrated in FIG. 2 the ring engaging inner surface of the bolting collar is frusto-conical; but it may be slightly concavely arcuate, provided the radius of curvature is sufficiently large at all parts of the surface that it makes a line contact with the ring and thus is effectively frusto-conical.

The bolting collars 16 have circumferentially spaced holes 24 which are aligned when the coupling is assembled so as to be impaled by shanks 17a of the bolt 17, and as seen in FIG. 2 the bolt shanks fit loosely in the aligned holes 24. The second radial faces 22 of the bolting collars are convex, as seen at 25, and a washer 17b under a bolt head 17c bears on one convex collar face 25 while a washer 18a under the nut 18 bears upon the other convex collar face 25.

As seen in FIGS. 2, 3 and 4, a first form of low temperature gasket 19 consists of a steel ring, indicated generally at 26, which has a radial flange 27 that is positioned between the adjacent pipe faces 10a and 11a, and a longitudinal flange 28 which surrounds the immediately adjacent end portions of the pipe lengths 10 and 11. Bonded to the faces of the radial ring 27 are rubber rings 29 which are seen in FIG. 3 to be generally hemispherical in cross section before they are compressed as seen in FIGS. 2 and 4 by the drawing up of the bolting collars 16.

A second type of low temperature gasket 119, illustrated in FIGS. 5 and 6, includes a reinforcing ring 127 which is parallel to the adjacent pipe ends, and a separate aligning ring 128 which encircles the pipes. A one-piece rubber ring 129 is moulded around the ring 127 and is joined to an annular kink 128a of the aligning ring 128. Each of the rubber rings 129 has a laterally enlarged upper portion 129a, a pair of annular recesses 129b below said portion, and a bifurcated lower end that has legs 129c flanking a recess 129d that is basically wedge-shaped in cross section.

As seen in FIG. 6, when the bolts are drawn up the enlarged portion 129a expands over the adjacent pipe ends and into the recesses 129b, while the legs 129c close against one another and fill in the recess 129d.

It is apparent from the foregoing detailed description that when a pair of pipe lengths 10 and 11 are to be coupled together the bolting collars 16 are first placed loosely around the pipe lengths with their faces 21 behind the grooves 13 and 14. The split rings 15 are then snapped around the pipe ends and seated in the grooves 13 and 14, and the bolting collars are slid approximately to the position of FIG. 2 where they loosely embrace the split rings. A gasket 19 or 119 is then positioned between the adjacent pipe ends 10a and 11a after the pipe ends have been brought close enough together for the longitudinal gasket flange 28 or 128 to overhang the adjacent end portions of the pipe lengths. The gasket is then held in a generally concentric relationship to the pipe lengths in any convenient manner while the bolt shanks 17a are extended through the aligned holes 24 in the bolting collars and the nuts 18 are threaded onto the bolts and drawn up sufficiently to compress the gasket slightly between the adjacent pipe ends 10a and 11a to maintain the concentric positioning of the gasket. The nuts 18 are then drawn up tightly upon bolts 17 to draw the bolting collars 16 strongly toward one another and slide the frusto-conical ring engaging surfaces 23 of the bolting collars over the rings 15 until the latter are firmly wedged in the grooves 13 and 14. Thus the force exerted on the collar by the bolt 17 and nut 18 acting as clamping means is transmitted through the rings 15 and the walls of the grooves 13 and 14 in the pipe lengths 10 and 11 to firmly couple the pipe lengths together, and compress the rubber structures of the gasket as seen in FIGS. 2, 4 and 6.

The loose fit of the bolt 17 in the holes 24 of the bolting collars 16 permits the bolting collars to give slightly and thus absorb shock loads which might otherwise crack the extremely brittle pipe lengths 10 and 11. The malleable material of the bolting collars also contributes to protecting the pipe.

It is apparent that on the frusto-conical ring contacting surfaces 23 of the bolting collars 16 permit the coupling to accommodate itself to pipe lengths of different outside diameters because on the larger diameter pipe the surface 23 contacts the ring 15 closer to the first radial face 21 of the collar than does the surface 23 of the collar which is around the smaller diameter pipe. This is clearly seen in FIG. 2 of the drawings.

For best results the angle of the ring contacting surfaces 23 of the bolting collars should be no less than about 20° and no more than about 30° to the collar axis. If the angle is much less than 20° it affords such a large radial component of force on the ring that excessive bolt tensions are required for a tight seal, while an angle much larger than 30° produces such a large longitudinal component of force that there is an undesirable great tendency to push the ring out of the groove in which it is seated. The drawings show the minimum angle of about 20°.

For pipe having an outside diameter greater than about eight inches the rings 15 may be mild steel; but for smaller pipe the rings must be spring steel which cannot be overstressed by the relatively large change in radius of curvature required to spring them around the end of the pipe and into the grooves.

The foregoing detailed description is given for clearness of understanding only, and no unnecessary limitations should be understood therefrom, as modifications will be obvious to those skilled in the art.

We claim:

1. A coupling for joining two lengths of hard pipe, said coupling comprising, in combination:

circumferential external grooves defined by shallow, arcuate surfaces close to the adjacent ends of the two pipe lengths;

a pair of split rings of substantially incompressible material which are generally round in cross section, one of said rings being seated in each groove;

a collar embracing each ring, each said collar having a first generally radially extending face near the adjacent pipe end, a second generally radially extending face remote from said adjacent pipe end, and a ring engaging inner surface which is effectively frusto-conical from the first face to the second face so as to make a line contact with the ring at any place between said faces, the circumference of said surface at said first face being greater than the outside circumference of the ring, and the circumference of said surface at said second face being less than the outside circumference of the ring but more than that of the pipe length;

compressible gasket means between adjacent ends of the pipe lengths;

and clamping means comprising threaded members forcing said collars strongly toward one another about the entire circumference of the pipe lengths, whereby the force exerted on the collars by the clamping means is transmitted from the effectively frusto-conical surfaces through the rings and the walls of the grooves in the pipe lengths to firmly couple said pipe lengths together in sealing engagement with the gasket.

2. The coupling of claim 1 in which the inner surfaces of the collars are frusto-conical and are at an angle of no less than about 20° and no more than about 30° to the collar axis.

3. The coupling of claim 1 in which the collars are provided with aligned holes, the second radial faces of the collars surrounding said holes are convex and the threaded members are bolts which loosely impale the aligned holes in the collars and have enlarged heads bearing on one convex collar face, and threaded nuts screwed onto said bolts which bear on the other convex collar face.

4. The coupling of claim 3 in which the gasket means is resilient, and its resilience is sufficient to maintain complete sealing contact with both pipe ends in spite of transient radial force producing small angular deflection of the coupled pipe lengths.

5. The coupling of claim 1 in which the pipe lengths consist of material which is brittle and of a very low flexibility, and the collars consist of material which is slightly more flexible than the material of the pipe lengths so as to deflect and thereby cushion the pipe lengths against shocks.

6. The coupling of claim 5 in which the pipe lengths consist of centrifugally cast iron and the collars consist of malleable material.

References Cited

UNITED STATES PATENTS 3,453,010   7/1969   Gerretz et al. _____ 285—414 X

FOREIGN PATENTS 994,834   8/1951   France.
960,139   6/1964   Great Britain.
654,887   6/1963   Italy.
332,255   8/1958   Switzerland.

DAVE W. AROLA, Primary Examiner

U.S. Cl. X.R.
285—415, 422